United States Patent
Hsu

(10) Patent No.: US 6,356,005 B1
(45) Date of Patent: Mar. 12, 2002

(54) WHEEL DRUM STRUCTURE OF INNER STATOR PORTION WITH AN INBUILT DRIVING CONTROL CIRCUIT

(76) Inventor: Chun-Pu Hsu, No. 19, Wu Chuang Liu Rd., Wu Ku Industrial Park, Taipei Hsien (TW)

(*) Notice: Subject to any disclaimer, the term of this patent is extended or adjusted under 35 U.S.C. 154(b) by 0 days.

(21) Appl. No.: 09/891,469

(22) Filed: Jun. 27, 2001

(51) Int. Cl.⁷ .................................................. H02K 1/12
(52) U.S. Cl. ................... 310/254; 310/67 R; 310/68 R; 310/89
(58) Field of Search .................... 310/254, 89, 67 R, 310/68 R, 91, 158, 259

(56) References Cited

U.S. PATENT DOCUMENTS

| 4,659,951 A | * | 4/1987 | Angi et al. ................... 310/62 |
| 4,773,829 A | * | 9/1988 | Vettori ........................ 417/366 |
| 4,883,982 A | * | 11/1989 | Forbes et al. ................. 310/62 |
| 5,083,052 A | * | 1/1992 | Ochi ............................ 310/64 |
| 5,663,603 A | * | 9/1997 | Sakashita et al. ............. 310/91 |
| 5,939,807 A | * | 8/1999 | Patyk et al. ................... 310/89 |
| 5,986,379 A | * | 11/1999 | Hollenbeck et al. ........ 310/257 |
| 6,137,197 A | * | 10/2000 | Taniguchi et al. ........ 310/67 R |

* cited by examiner

Primary Examiner—Nestor Ramirez
Assistant Examiner—Thanh Lam
(74) Attorney, Agent, or Firm—Rabin & Berdo, P.C.

(57) ABSTRACT

The present invention provides a wheel drum structure of an inner stator portion with an inbuilt driving control circuit, which has the advantages of shortest conductor length, lowest wire resistance, and immune to disturbance. An inner stator portion is divided into a stator inner ring portion, inner stator teeth, and wire groove seats. The wire groove seats are sleeved into the stator inner ring portion after stator coils are installed therein. Wire heads/tails of the stator coils are respectively soldered to a stator coil circuit board. The stator inner ring portion has a maximal hollow space. Two end cover plates cover two end faces of the stator inner ring portion. The covered stator inner ring portion having the hollow space can receive a driving control circuit. Central ends of the end cover plates forms a concentric through hole so that a supporting shaft can be tightly joined therein.

9 Claims, 6 Drawing Sheets

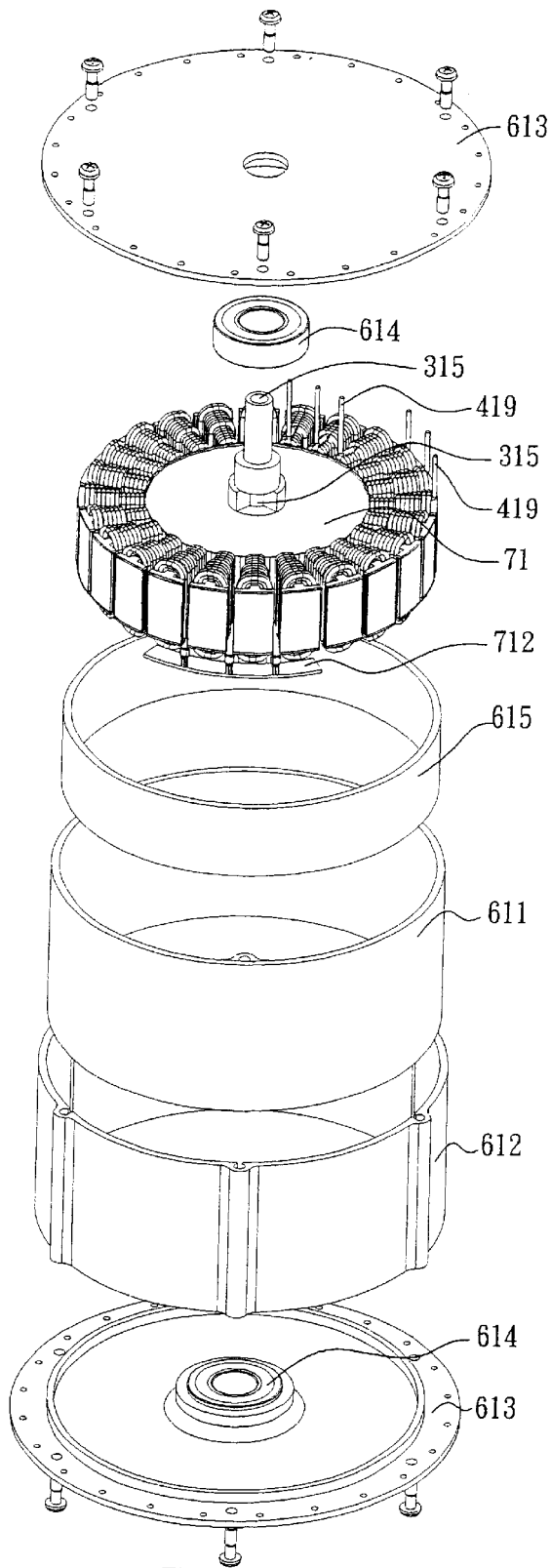
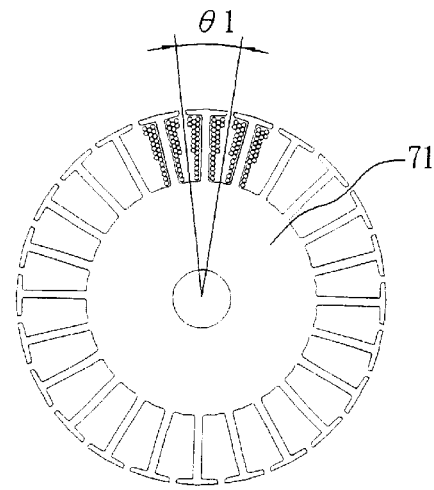
Fig. 1B
PRIOR ART
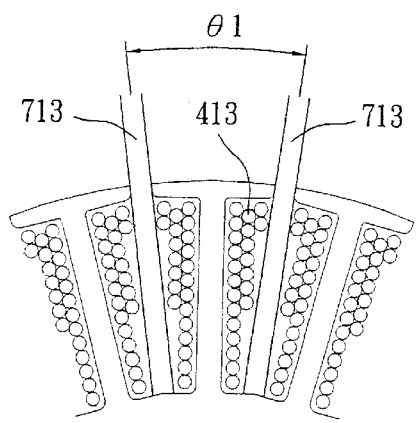
Fig. 1C
PRIOR ART
Fig. 1A
PRIOR ART

WHEEL DRUM STRUCTURE OF INNER STATOR PORTION WITH AN INBUILT DRIVING CONTROL CIRCUIT

FIELD OF THE INVENTION

The present invention relates to a wheel drum structure of an inner stator portion with an inbuilt driving control circuit and, more particularly, to a wheel drum type outer rotor motor having an inner stator portion, which uses an inner ring portion thereof to build a maximal hollow space to receive a driving control circuit therein.

BACKGROUND OF THE INVENTION

As shown in FIG. 1A, a prior art wheel drum type outer rotor motor comprises an axial through inner hole 315, coil wire heads/tails 419, a magnet iron yoke ring 611, an outer rotor housing 612, a housing end cover plate 613, a bearing 614, an outer rotor magnet 615, an inner stator 71, and a sensing circuit board 712.

The bottleneck of manufacturing a motor of high operational efficiency usually arises in the problem of winding an exciting coil, e.g., a winding path 713 of a winding guide needle shown in FIGS. 1B and 1C. For a motor to have a high operational efficiency, it must have corresponding electric load and magnetic load. The electric load relates to the thickness of wound conductor of an exciting coil of a stator. A higher electric load represents a higher exciting current. To have a higher exciting current, an exciting coil with a thicker wound conductor is required so that the higher exciting current can flow therein. To enhance the effective operational efficiency of a motor, the occupied ratio of volume of an exciting coil in a wire groove must be increased to receive stator coils of thicker wire and lower impedance, e.g., stator coils 413 shown in FIGS. 2B and 2C.

Additionally, a driving control circuit of a conventional wheel drum type motor is installed outside the motor. Because a guide wire connected between the driving control circuit or a detecting circuit and the motor is longer, the whole control system is easily affected. Moreover, the installed position of the driving control circuit is also a problem. If the driving control circuit is used in an electric light vehicle, the path of the guide wire between the wheel drum type motor and the driving control circuit and delicacy of the whole system must be taken into account.

SUMMARY OF THE INVENTION

In consideration of the problems of a conventional wheel drum type motor, the inner bore of a conventional inner stator portion (e.g., an inner stator 71 shown in FIG. 1B) is maximally enlarged (e.g., a hollow space 213 shown in FIG. 2B). Because it is alright that magnetic conduction space at the inner bore portion is appropriate when a motor is excited, the inner bore of a stator inner ring portion can be enlarged. The enlarged hollow space can receive a driving control circuit of the motor, hence resolving the problems of disposition of the circuit, wiring engineering, and circuit disturbance. Furthermore, a root end of the stator portion can be equiangularly separated from an outer ring portion of the inner stator according to the number of wire grooves. The separated root end must correspond to the outer ring portion of the inner stator to build embedded joining ends penetrating each other. Therefore, an insulated wire groove seat of the stator root end can be formed at the outer stator coil in advance and then insulatedly disposed in a wire groove seat. This represents that the occupied ratio of volume of the stator coil in the stator wire groove can be greatly enhanced (e.g., ($\theta 2$) shown in FIGS. 2B and 2C). A wheel drum structure of an inner stator portion with an inbuilt driving control circuit of the present invention can let a wheel drum type motor have a high operational efficiency, a high structural strength, and the characteristics of easy installation and maneuver and immune to disturbance.

The various objects and advantages of the present invention will be more readily understood from the following detailed description when read in conjunction with the appended drawing, in which:

BRIEF DESCRIPTION OF THE DRAWINGS

FIG. 1A is an exploded perspective view of a prior art outer rotor wheel drum type motor;

FIGS. 1B and 1C show $\theta 1$ windings of a prior art outer rotor wheel drum type motor;

DETAILED DESCRIPTION OF THE PREFERRED EMBODIMENT

Figures 2A, 2B, 2C:
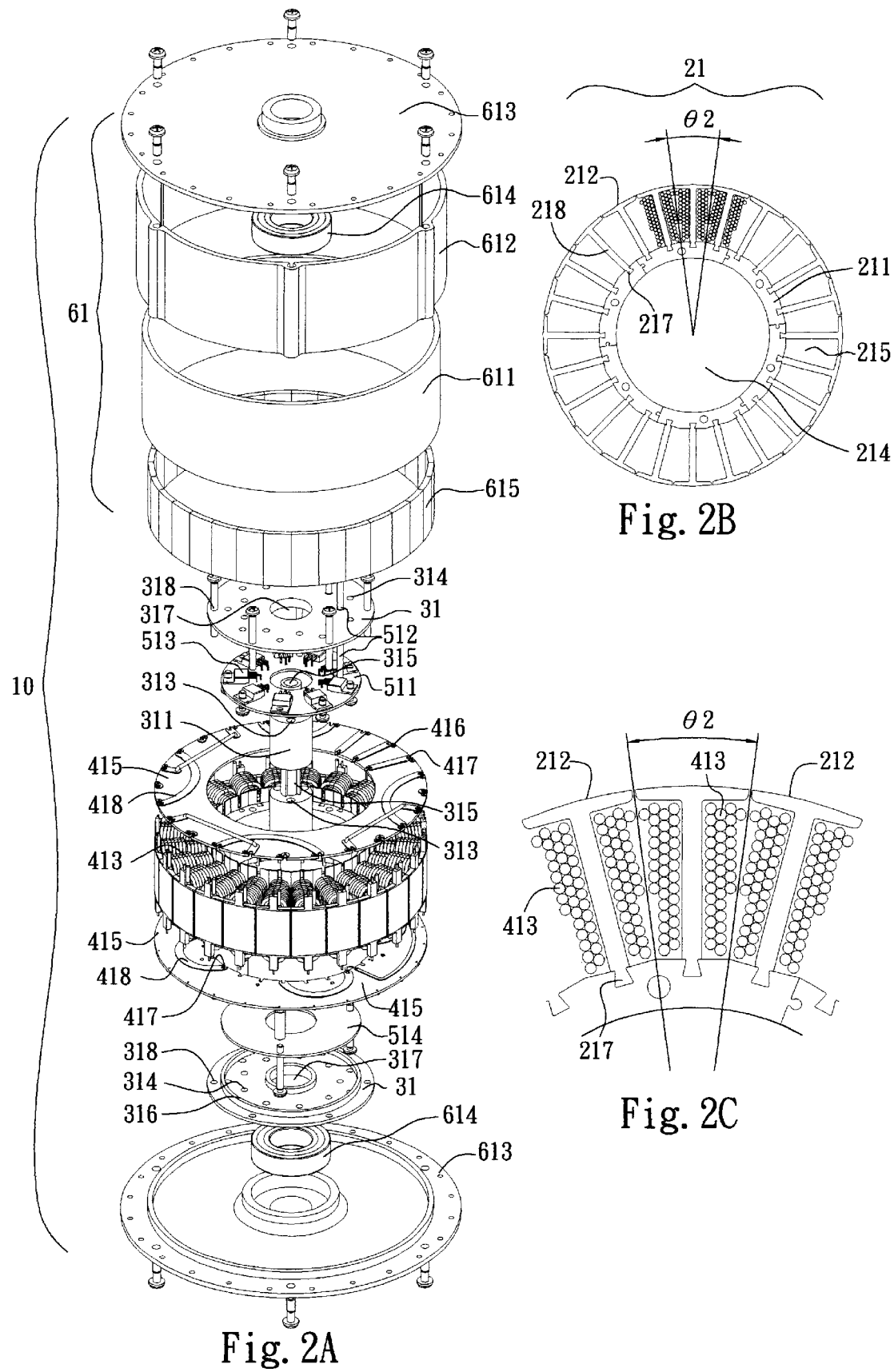
FIG. 2A is an exploded perspective view of a wheel drum type motor according to an embodiment of the present invention.
FIGS. 2B and 2C show $\theta 2$ windings of a wheel drum type motor according to an embodiment of the present invention.
Figure 3:
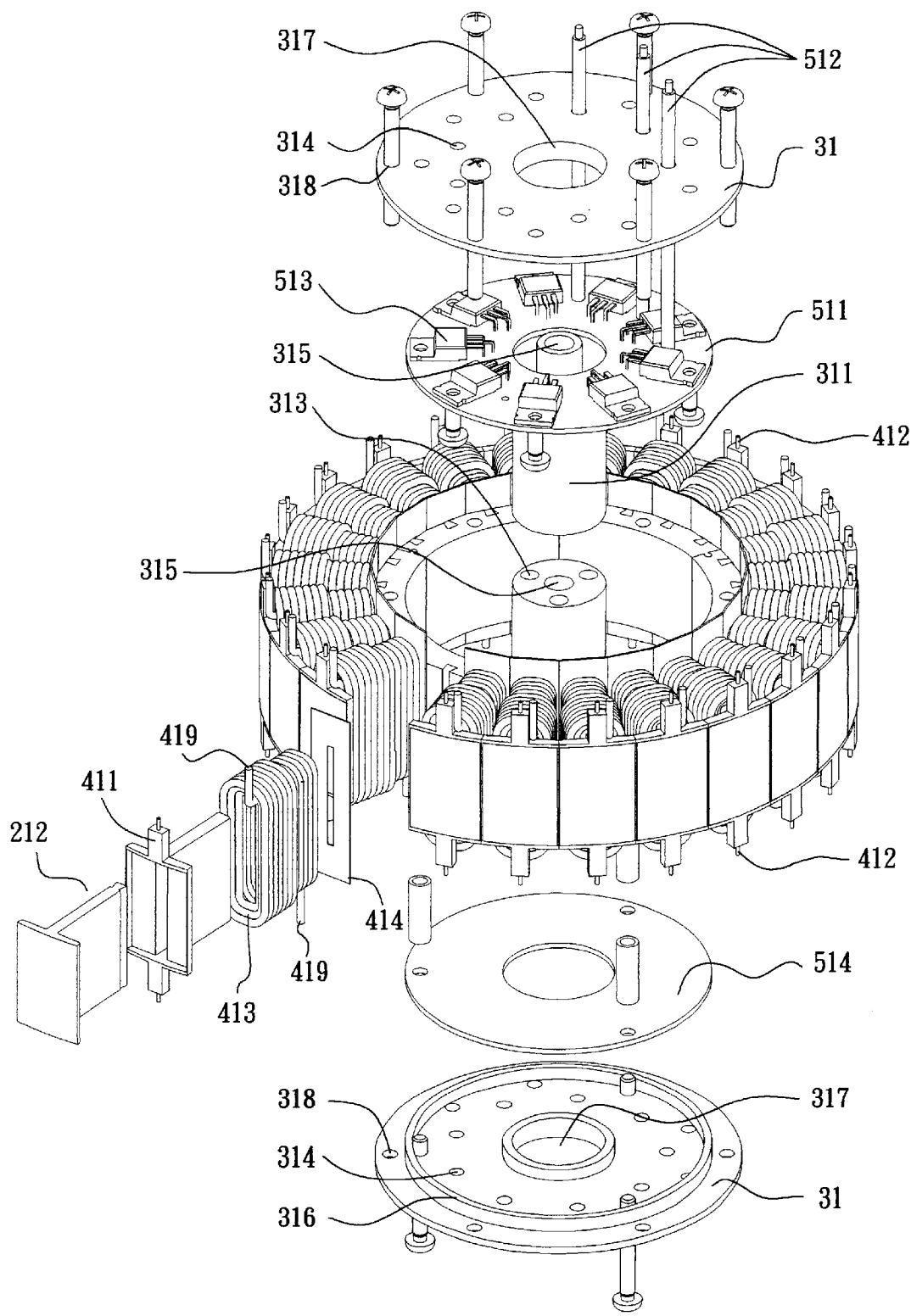
FIG. 3 is an exploded perspective view showing that a driving control circuit is disposed in a hollow space of a stator inner ring portion of an inner stator portion according to an embodiment of the present invention.
Figure 4A:
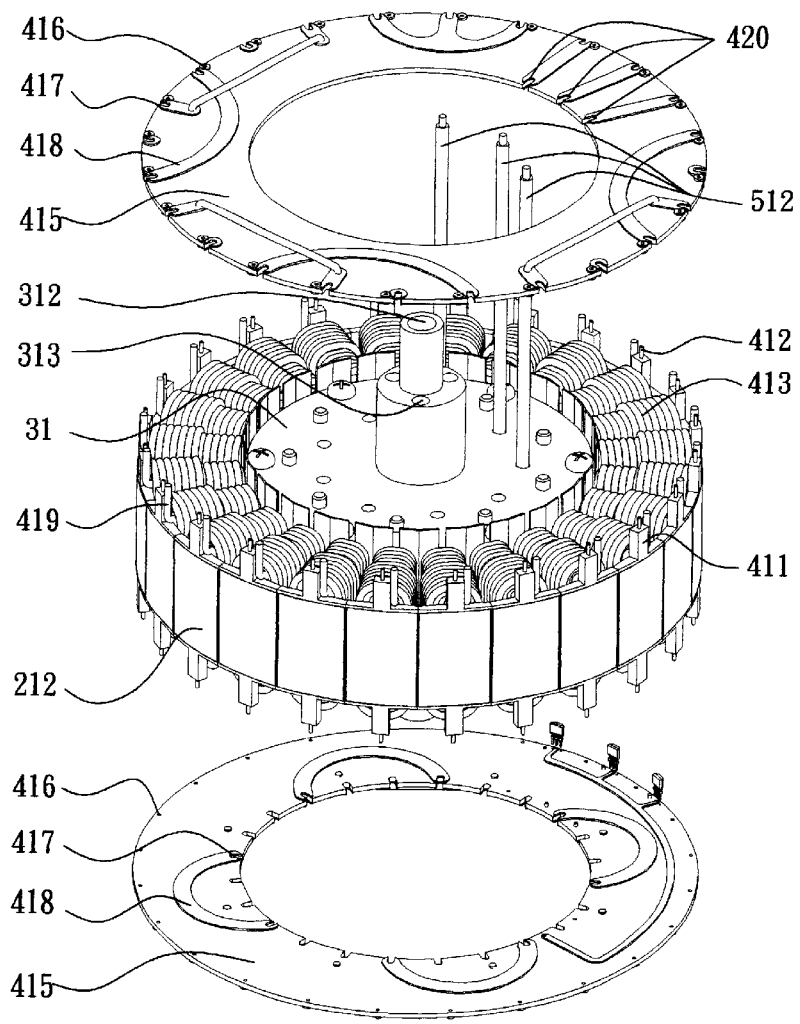
FIG. 4A is an exploded perspective view showing a connection way of wire of a driving circuit and a stator coil circuit board according to an embodiment of the present invention.
Figure 4B:
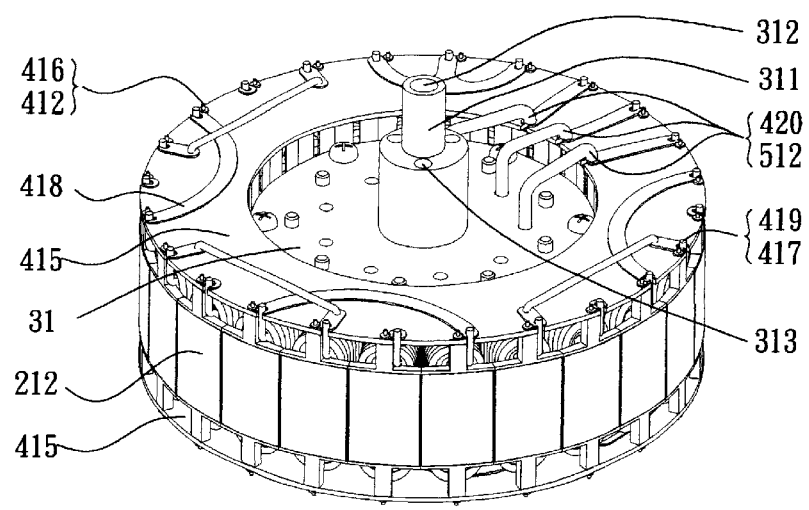
FIG. 4B is a perspective view showing a connection way of wire of a driving circuit and a stator coil circuit board according to an embodiment of the present invention.
Figures 5A, 5B, 5C:
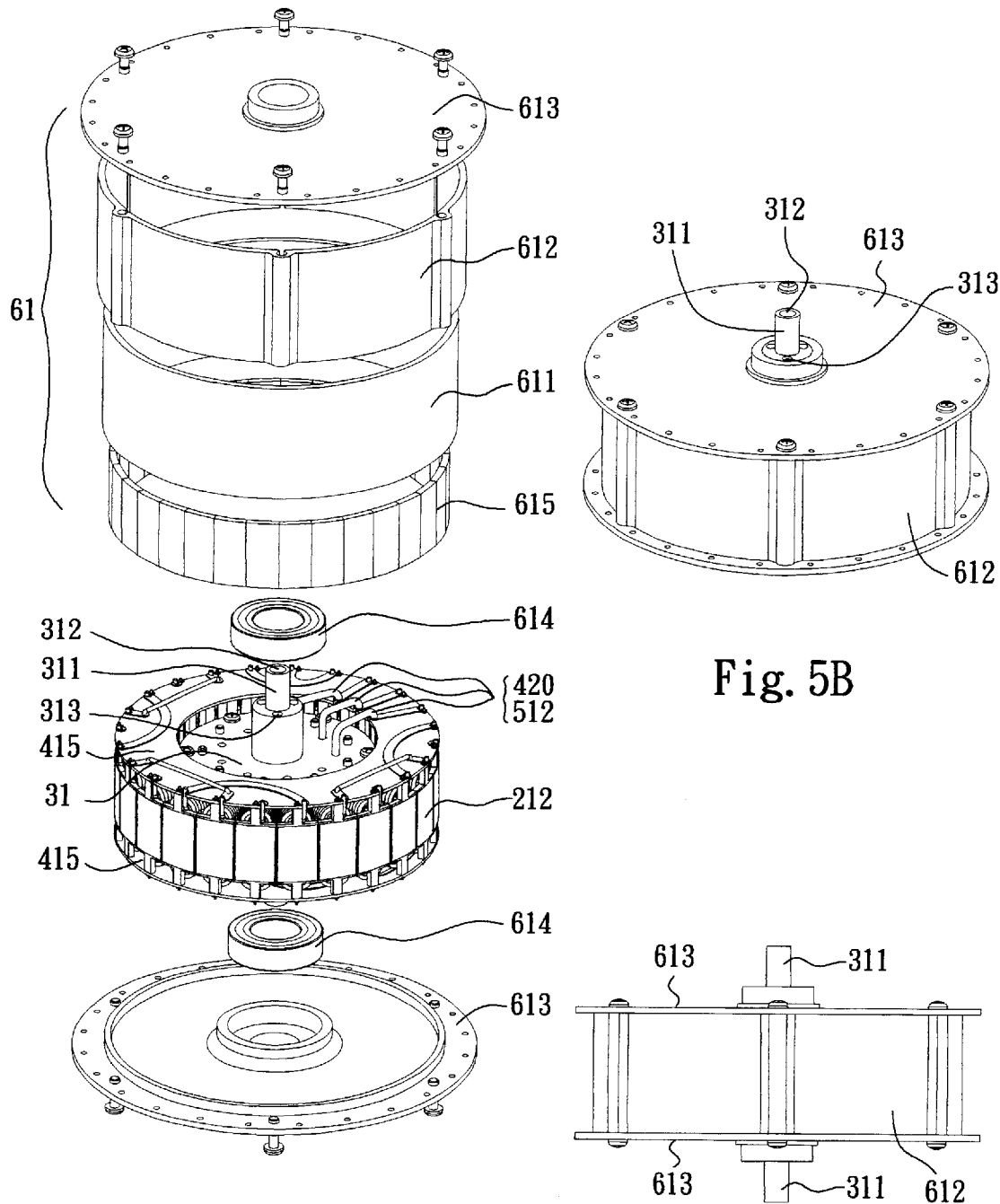
FIG. 5A is a perspective view of an assembled inner stator portion and an outer rotor portion according to an embodiment of the present invention.
FIG. 5B is a perspective side view of an assembled wheel drum according to an embodiment of the present invention.
FIG. 5C is a side view of an assembled wheel drum according to an embodiment of the present invention.

As shown in FIGS. 2A to FIG. 6B, a wheel drum structure of an inner stator portion with an inbuilt driving control circuit of the present invention comprises an inner stator portion 21, a stator coil circuit board 415, two end cover plates 31, a driving control circuit, a wheel drum supporting shaft 311, and an outer rotor portion 61.

An inner ring portion 211 of the inner stator portion 21 forms a maximal hollow space 214. The outer edge end of the inner ring portion 211 extends outwards equidistantly and radially to form a plurality of stator teeth 212. Wire grooves 215 are formed between adjacent stator root ends 218 to receive stator coils 413.

The stator coil circuit board 415 provides a plurality of solder holes 417 so that wire heads/tails 419 of the stator coils 413 can penetrate through and be fixed. The stator coil circuit board 415 also has a plurality of circuit board positioning holes 416, circuit copper foil lines 418, and connection wire solder holes 420.

The two end cover plates 31 cover an upper and a lower end faces of the stator inner ring portion 211. Central ends of the two end cover plates 31 correspond to a common center of the outer rotor portion 61 and the inner stator portion 21 of a motor to form a concentric through hole 317.

The driving control circuit is soldered and fixed on a driving circuit board 511 and a control circuit board 514, which are locked at one side of the two end cover plates 31 and disposed in the hollow space 214 of the stator inner ring portion 211. The driving circuit board 511 also has driving circuit connection wires 512 and driving circuit switches 513.

The wheel drum supporting shaft 311 is tightly joined in the concentric through hole 317 at the central ends of the two end cover plates 31, and protrudes out of a housing end cover plate 613 of the wheel drum. At least more than one through holes 312 and 313 are disposed at and beside the axis of the supporting shaft 311 to be penetrated through by power supply wires of the driving control circuit. Instructions of the control circuit are also transferred from an external control system via the through holes 312 and 313.

The outer rotor portion 61 comprises a bearing 614. The inner bore of the bearing 614 is sleeved onto the wheel drum supporting shaft 311, and the outer bore thereof is sleeved into the housing end cover plate 613 of the outer rotor portion 61. The housing end cover plate 613 clips and locks an outer rotor magnet 615 and a magnet iron yoke ring 611 to excite armature reaction with the inner stator portion 21.

The stator coils 413 in the inner stator portion wire grooves 215 are formed by separately winding (e.g., with a spindle winding machine) or bending (e.g., with a spring-forming machine). Each of the stator coils 413 is sleeved into a wire groove seat 411, installed at one of the stator root ends 218 and matched with an insulating sheet 414, and then sleeved into an embedding groove 217 of the stator ring portion 211. Each of the wire groove seats 411 also has a positioning needle 412.

The stator coils 413 in the inner stator portion wire grooves 215 can be directly wound in the wire groove seats 411, installed at the stator root ends 218, and then sleeved into the embedding grooves 217 of the stator ring portion 211.

The stator coils 413 in the inner stator portion wire grooves 215 can also be formed by concentratedly winding across grooves, and are then insulatedly installed into the stator wire grooves.

Figure 6B:
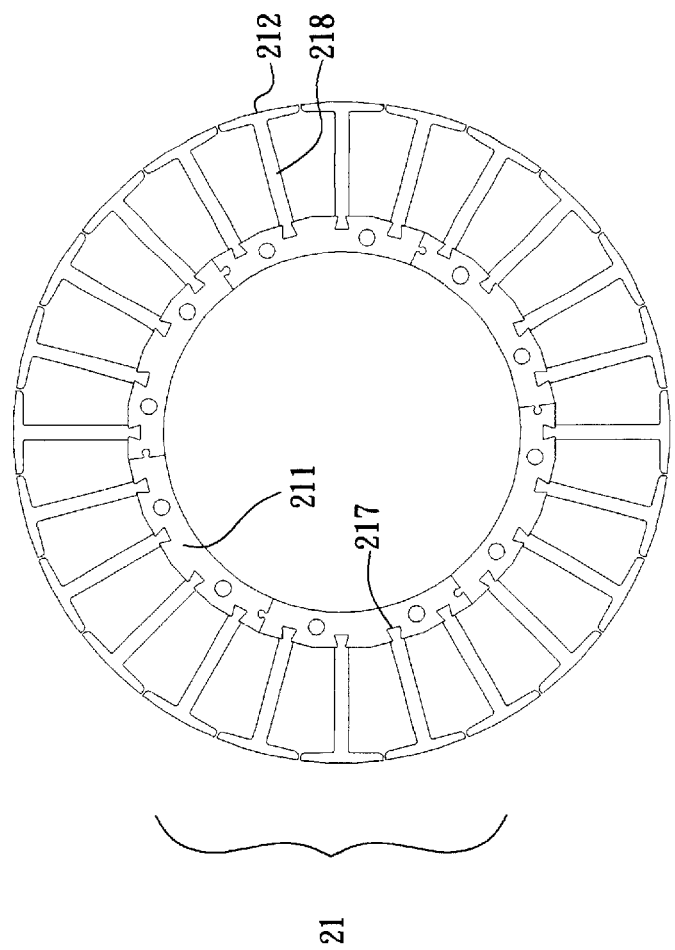
FIGS. 6A and 6B show cross-sectional views of an integrally formed inner stator portion and an assembled inner stator portion according to an embodiment of the present invention.

The stator inner portion 211 and the stator teeth 212 of the inner stator portion 21 can be independently formed by drawing and stacking. The stator teeth 212 are assembled with the wire groove seats 411 and the stator coils 413 and then sleeved with the stator inner ring portion 211 to form the whole inner stator portion 21, as shown in FIG. 6B.

Figure 6A:
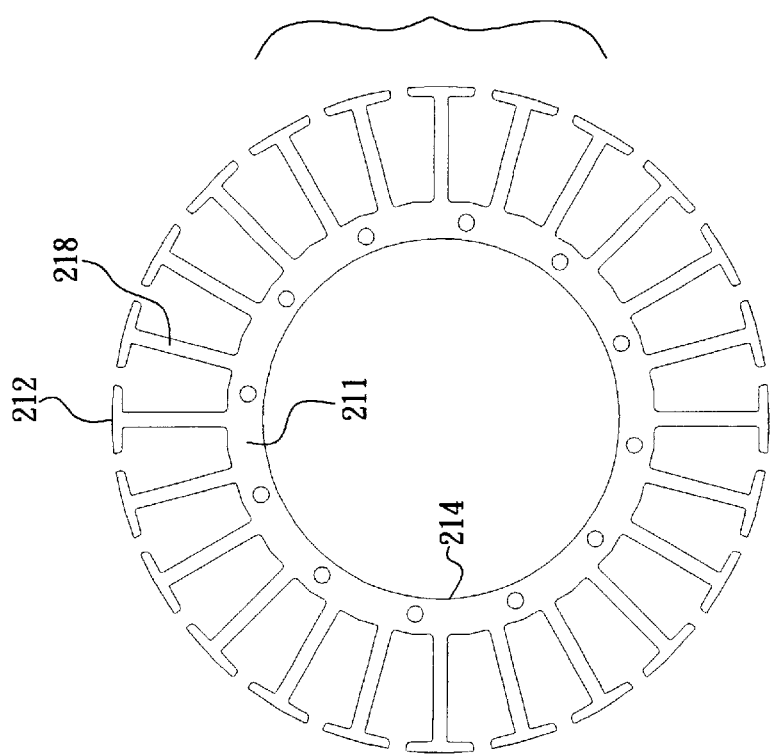

The stator inner portion 211 and the stator teeth 212 of the inner stator portion 21 can also be integrally formed by drawing and stacking, as shown in FIG. 6A. The stator coils 413 are then insulatedly installed into the wire grooves 215.

It is feasible that only the driving circuit board 511 of the driving control circuit is installed in the hollow space 214 of the stator inner ring portion 211.

It is also feasible that both the driving circuit board 511 and the control circuit board 514 of the driving control circuit are installed in the hollow space 214 of the stator inner ring portion 211.

Outer edge ends of the end cover plates 31 of the inner stator portion 21 correspond to the hollow space 214 of the inner ring portion 211 to form flange ends 316, which cover an upper and a lower end faces of the stator inner ring portion 211. The end cover plates 21 also have a plurality of through holes 314. An outer periphery of each of the flange ends 316 has a plurality of end cover plate positioning holes 318, which are concentrically locked with two end faces of the stator inner ring portion 211 to form the hollow space 214 of the inner ring portion 211. The driving circuit of the driving circuit board 511 in the hollow space 214 is soldered to the stator coils 413 to form an exciting coil winding network. The control circuit board 514 is controlled by an external control system to let the driving circuit board 511 maneuver the stator coils 413 to excite armature reaction with the outer rotor magnet 615.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A wheel drum structure of an inner stator portion with an inbuilt driving control circuit, comprising:

an inner stator portion whose inner ring portion forms a maximal hollow space, an outer edge end of said inner ring portion extending outwards equidistantly and radially to form a plurality of stator teeth, wire grooves being formed between adjacent stator root ends to receive stator coils;

a stator coil circuit board providing a plurality of solder holes so that wire heads/tails of said stator coils can penetrate through and be fixed;

two end cover plates covering an upper and a lower end faces of said stator inner ring portion, central ends of said two end cover plates corresponding to a common center of an outer rotor portion and said inner stator portion of a motor to form a concentric through hole;

a driving control circuit soldered and fixed on a driving circuit board and a control circuit board, which are locked at one side of said end cover plates and disposed in said hollow space of said stator inner ring portion;

a wheel drum supporting shaft tightly joined in said concentric through hole at the central ends of said end cover plates and protruding out of a housing end cover plate of the wheel drum, at least more than one through holes being disposed on said supporting shaft to be penetrated through by power supply wires of said driving control circuit, instructions of said control circuit being also transferred from an external control system via said through holes; and an outer rotor portion comprising a bearing, an inner bore of said bearing being sleeved onto said wheel drum supporting shaft, and an outer bore thereof being sleeved into said housing end cover plate of said outer rotor portion, said housing end cover plate clipping and locking an outer rotor magnet and a magnet iron yoke ring to excite armature reaction with said inner stator portion.

2. The wheel drum structure of an inner stator portion with an inbuilt driving control circuit as claimed in claim 1, wherein said stator coils in said wire grooves are formed by separately winding or pressing and bending, each of said stator coils being sleeved into a wire groove seat, installed at a stator root end, and then sleeved into an embedding groove of said stator ring portion.

3. The wheel drum structure of an inner stator portion with an inbuilt driving control circuit as claimed in claim 1, wherein said stator coils in said wire grooves are directly wound in said wire grooves, installed in stator root ends, and then sleeved into embedding grooves of said stator ring portion.

4. The wheel drum structure of an inner stator portion with an inbuilt driving control circuit as claimed in claim 1, wherein said stator coils in said inner stator portion wire grooves are formed by concentratedly winding across grooves and then insulatedly disposed into said wire grooves.

5. The wheel drum structure of an inner stator portion with an inbuilt driving control circuit as claimed in claim 1, wherein said stator inner ring portion and said stator teeth of said inner stator portion are independently formed by drawing and stacking, and said stator teeth are assembled with wire groove seats and said stator coils and then sleeved with said stator inner ring portion to form a whole inner stator portion.

6. The wheel drum structure of an inner stator portion with an inbuilt driving control circuit as claimed in claim 1, wherein said stator inner ring portion and said stator teeth of said inner stator portion are integrally formed by drawing and stacking, and said stator coils are then insulatedly installed into said wire grooves.

7. The wheel drum structure of an inner stator portion with an inbuilt driving control circuit as claimed in claim 1, wherein only said driving circuit board of said driving control circuit is installed in said hollow space of said stator inner ring portion.

8. The wheel drum structure of an inner stator portion with an inbuilt driving control circuit as claimed in claim 1, wherein both said driving circuit board and said control circuit board of said driving control circuit are installed in said hollow space of said stator inner ring portion.

9. The wheel drum structure of an inner stator portion with an inbuilt driving control circuit as claimed in claim 1, wherein outer edge ends of said end cover plates of said inner stator portion correspond to said hollow space of said inner ring portion to form flange ends, which cover an upper and a lower end faces of said stator inner ring portion, an outer periphery of each of said flange ends having a plurality of end cove plate positioning holes, which are concentrically locked with two end faces of the stator inner ring portion to form said hollow space of said inner ring portion, a driving circuit of said driving circuit board in said hollow space is soldered to said stator coils to form an exciting coil winding network, said control circuit board being controlled by an external control system to let said driving circuit board maneuver said stator coils to excite armature reaction with said outer rotor magnet.

\* \* \* \* \*